United States Patent Office 3,616,817
Patented Nov. 2, 1971

3,616,817
HYDRAULIC DISTRIBUTORS
Louis Pignolet, Lyon, France, assignor to Societe Industrielle Generale de Mecanique Appliquee S.I.G.M.A.
Filed Aug. 4, 1969, Ser. No. 847,319
Int. Cl. F16k 11/07
U.S. Cl. 137—625.68               10 Claims

ABSTRACT OF THE DISCLOSURE

An improved hydraulic distributor having a body and a plunger positioned within a bore in said body to form a slide valve. The slide valve communicates with a pilot valve and a control circuit. The bore and/or the plunger have narrow longitudinal slots in their sliding surfaces to effect gradual opening and closing of the control circuit during said relative displacements. The distributor is especially useful in heavy earth-moving machines.

---

The invention is concerned with hydraulic distributors of the type which comprises two first elements comprising a distributor body and a plunger, or actuating slide valve, positioned within the distributor body, these two elements being capable of displacement relative to each other and having surfaces in sliding contact, and a third pilot element constituted by a value for limiting the pressure or discharge valve, that is to say, a valve adapted to be opened or closed dependent on whether a control circuit which is connected to the distributor is open (when the slide valve is in a neutral position) or closed (when the slide valve is in working posiiton).

In the distributors of the invention, the control circuit comprises two separate annular chambers or grooves formed in said distributor body and displaced with respect to each other in the direction of relative displacement, two communicating means or channels adapted to connect independently one of the grooves to a pressure means, such as a pump and the other groove to a container for uncompressed liquid, or tank. The actuating slide value in its working position is adapted to close the grooves in such a manner as to isolate them and, in its neutral to place the grooves in communication with each other by means of a third groove which the slide valve carries peripherally.

The invention is particularly concerned with distributors suitable, but not exclusively, for earth-moving machinery because it is in such applications that these distributors seem to have the greatest advantages.

The invention has for an object improvements in hydraulic distributors so that they will be better suited to the various requirements of practice, particularly concerning a gradual increase or decrease of the pressure of the pump during the displacement of the actuating slide valve.

According to the invention a distributor of the type described comprises recesses or slots on at least one of the two first above-mentioned elements, the recesses extending in a direction essentially parallel to the relative displacement movement of said elements, and having cross-sections perpendicular to the direction of said relative displacement, the cross-sections being such as to vary in a continuous manner, said recesses opening separately, on one hand into one of the grooves of said elements and, on the other hand onto the surfaces of said elements which come into contact with each other. Said recesses are so positioned as to cause a gradual opening and closing of the control circuit during the relative movement of said elements.

The invention comprises in addition to the above main feature other features which shall be described more explicitly below. In particular, the invention deals with certain applications and methods of using the various features described herein. The invention also deals with new industrial machinery, comprising the distributors of the present invention having the features described herein, the special elements suitable for their construction application, as well as various earth moving machinery such as industrial shovels, scrapers, bulldozers and other machinery using similar distributors.

The invention is further explained by means of and reference to the description which follows as well as the drawings annexed hereto, which describe of preferred embodiment of the invention. In the drawings.

Figure 1:
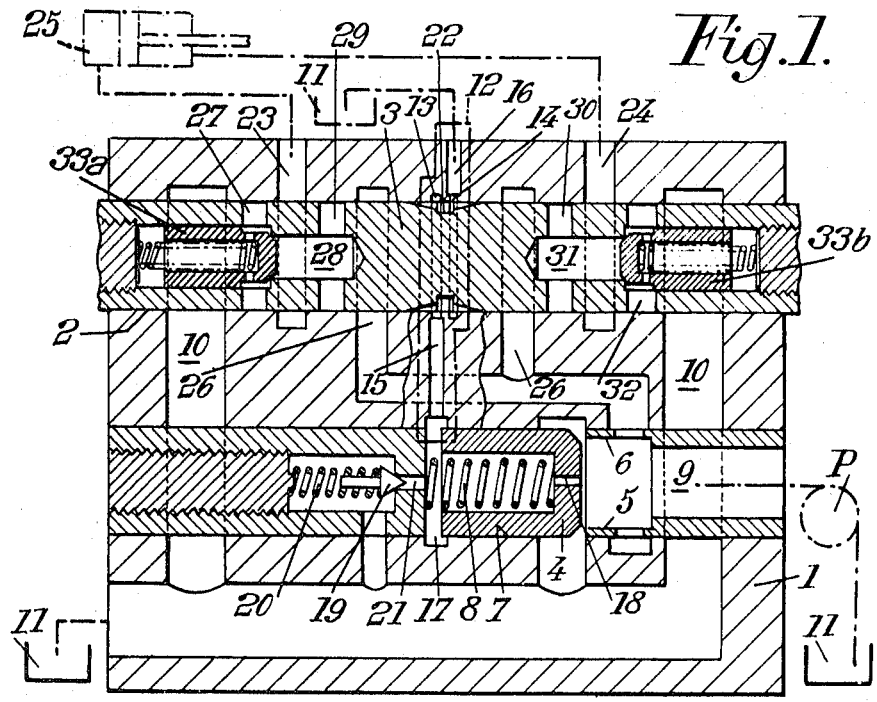
FIG. 1 illustrates a longitudinal section of an embodiment of a distributor according to the invention, the slide valve being positioned in the neutral position.

In accordance with the invention in particular in accordance with its means of production of its various parts which are preferred at this time, to provide a hydraulic distributor which is capable of a gradual increase in pressure of the pump procedure is as follows.

As regards the distributor as a whole, it is arranged to comprise two first elements constituted by distributor body 1, which is provided with bore 2 and cylindrical actuating slide valve plunger 3, sliding in said bore, and a third element constituted by means for limiting the pressure or discharge valve 4 which may be cylindrically shaped and can rest on seat 5 which has a bore 6 having a cross-section smaller than another bore 7 which acts as guide means to valve 4. In valve 4 the cross-section of its seat and the cross-section of the guiding means is different. The valve is subjected to the action of return spring means 8 which urges the valve against its seat 5.

The surface of bore 2 and the exterior cylindrical surface of plunger 3 constitute the two surfaces of the two first elements which are in contact with each other. When valve 4 is closed, that is when valve 4 rests on seat 5 communication between chamber 9 where the fluid arrives from the pump and chamber 10 connected to container 11, is interrupted. When valve 4 is unseated or open as is shown in FIG. 1, the fluid coming from pump P can then pass from chamber 9 to chamber 10 between valve 4 and its seat 5.

Valve 4 is in the closed or open position depending on whether control circuit 12 traverses distributor 1 or not. It is opened when plunger 3 is in neutral position or closed when the plunger is in the working position. The control circuit comprises within the body of distributor 1 two annular grooves 13 and 14 formed in the bore 2 and displaced one with respect to the other along the axial direction of plunger 3 and two conduits 15 and 16. Conduit 15 connects groove 13 to a chamber 17 into which flows liquid under the pressure of the pump after having passed through a calibrated opening 18 positioned in the front of valve 4. Conduit 16 connects groove 14 to container 11 either directly as is the case of a single distributor or indirectly by means of control circuits of other distributors connected to the same pump P.

A conically shaped pilot valve 19 cooperating with calibration spring means 20 provides for a limit to the operating pressure pump of the pump, as is explained below, at a maximum value dependent, on one hand, on the cross-section of a bore 21 of which one end opens into chamber 17 and the other end constitutes the seat of the valve 19, and on the other hand on the actuating force of spring 20. When the pressure in chamber 17 is sufficient to push back valve 19, the liquid of chamber 17 can pass between means 19 and its seat and so return to chamber 10.

Control circuit 12 is open when a third annular chamber or groove sleeve 22 carried by plunger 3 provides communication between the two grooves 13 and 14. Plunger 3 then occupies a neutral position, as illustrated in FIG. 1.

When the control circuit is open, the fluid flowing from pump P under pressure can flow into chamber 9 to container 11 by passing through calibrated opening 18, chamber 17, conduit 15, grooves 13, 22 and 14 and conduit 16. As the liquid flows into opening 18, there occurs a pressure drop which is evidenced by a higher pressure upstream of valve 18 than downstream of the valve. This difference between the pressures upstream and downstream may be sufficient to unseat valve 18 and the liquid of the pump will then pass from chamber 9 to chamber 10 and return to container 11. The pressure of the fluid is not increased as a result of the passage existing between the open valve 18 and seat 5. In this neutral position cylinder 3 closes conduits 23 and 24, positioned within the distributor and which are connected, for instance, to a jack 25 on the side of the piston for conduit 23 and on the side of the piston rod for conduit 24.

The control circuit is closed when plunger 3, whether displaced to the left or right position, closes grooves 13 and 14. The communication which had been established previously through grooves 22 is now closed and plunger 3 occupies an operative position.

Figure 2:
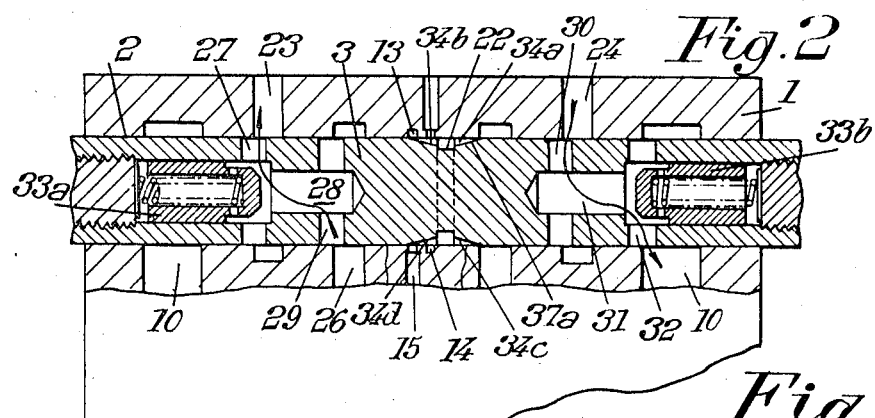
FIG. 2 illustrates a partial longitudinal section of the distributor of FIG. 1 in which the plunger has been slightly displaced towards the right.

When the control circuit is closed, the liquid under pressure flowing from pump P can no longer flow from groove 13 to groove sleeve 14. The flow of liquid from chamber 17 to container 11 through conduits 15 and 16 is thus interrupted. The pressure of the liquid in chamber 17 increases and valve 4 is displaced towards its seat 5. Since the liquid cannot pass any longer from chamber 9 to chamber 10, its pressure increases in chamber 9. Plunger 3 being displaced towards the right as is shown in FIG. 2 then connects gradually conduit 23 with chamber 26, which is connected to chamber 9 by means of conduits 27, 28 and 29 which are arranged in said plunger; furthermore, conduit 24 is gradually placed in communication with chamber 10 by means of conduits 30, 31 and 32 which are arranged in said plunger. Under these conditions the liquid under pressure feeds the interior of the jack at the piston end thereof; the liquid from the interior of the jack at the rod end thereof can return to chamber 10 and thence to container 11.

Plunger 3 is provided with non-return valves 33a and 33b to prevent the reverse flow of liquid in a direction opposite to that desired. For example, as is illustrated in FIG. 2, non-return value 33a precludes the flow of liquid from the interior of the jack at the piston end thereof towards the pump if the pressure of the liquid in the jack is higher than the pressure delivered by the pump.

In the working position of plunger 3, the pressure in chamber 17 can exceed the threshold value determined by conical control valve 19. This occurs in practically all cases. In operation, while plunger 3 is displaced, for instance, towards the right as is shown in FIG. 2, communication between grooves 13 and 14 is abruptly cut, the communication means, on one hand, between chamber 26 and conduit 23, on the other hand, between conduit 24 and chamber 10, are gradually reestablished and become complete only towards the end of the displacement course of plunger 3 when, for instance, conduit 29 opens entirely into chamebr 26. At the start of the displacement of plunger 3, the liquid flowing from pump P can only flow from groove 13 to container 11 and can only feed jack 25 by flowing through narrow openings such as those formed by conuit 29 and chamber 26 of FIG. 2, which are only in partial communication with each other. As a result, there are serious losses in load or energy at these narrow passages. The pressure of the liquid increases very rapidly in chambers 9 and 17 and very often reaches the threshold limit as determined by conical valve means 19, even when the pressure necessary for actuating jack 25 is below the threshold pressure.

The opening of the conical valve 19 allows the fluid from chamber 17 to flow into chamber 10 and thence into reservoir 11. A further flow is caused through the calibrated opening 18 from chamber 9 into chamber 17. As explained above, this flow is accompanied by a pressure drop which contributes to causing a displacement of valve 4 from the right to the left. The fluid can then flow from chamber 9 to chamber 10 through valve 4 and its seat 5 and the pressure in chamber 9 is maintained essentially equal to the threshold pressure as determined by conical valve 19.

When the pressure in chamber 17 drops below the threshold pressure, that is when the pressure in chambers 9 and 26 itself becomes in practice less than the threshold pressure, valve 19 is closed causing the complete closing of opening 18. This is caused in particular when communication is fully established between jack 25 and chambers 26 and 10 and the working requirement of jack 25 is below the threshold pressure determined by conical valve 19.

It would be appropriate at this point of the description and before describing the main feature of the invention, to point out the shortcomings that a distributor as described above would have without special arrangements.

In such a distributor as described, small displacement of plunger 3 away from the neutral position will aways cause pump P to work at the threshold pressure fixed by conical valve 19, while such a high pressure is not generally necessary to actuate jack 25. This is due to the fact that a small displacement of plunger 3 causes an abrupt closing of control circuit 12 and a small opening which increases gradually the circulation of the liquid from pump P to jack 25 and reservoir 11. This small opening causes important pressure losses, for instance, in the connections from chamber 26 to conduit 29, or from conduit 27 to passage means 23. To these losses there must be added the work requirement of jack 25, and this total requirement often exceeds the threshold pressure determined by valve 19.

For operations such as the leveling and smoothing of ground where the machine works constantly by small displacements of plunger 3, pump P will work constantly at the threshold pressure. This is particularly objectionable to the maintenance of the pump and of the circuit causing oveheating of the system. There is further an excessive consumption and waste of energy and of fuel. An important object of the invention is to overcome these shortcomings.

In accordance with the invention, there are provided openings, hereinafter designated as slots 34a, 34b, 34c and 34d, which are embodied by at least one of the two first elements, that is body 1 and plunger 3. Preferably, these slots are provided in plunger 3. The slots extend in a direction essentially parallel to the displacement direction of elements 1 and 3 relative to each other, and have cross-sections which are perpendicular to the direction of the relative movement and varying in a continuous manner. The slots have separate openings, on one side, in grooves 13, 14 and 22 of said elements 1 and 3, but preferably the openings are positioned in groove 22 of the plunger, and on the other side on the surfaces of these elements which come into contact with each other. The slots are so positioned as to insure a gradual closing and opening of control circuit 12 during the relative movement of said elements 1 and 3.

In the embodiment of the invention illustrated by the figures, slots 34a and 34b are so positioned on the plunger on each side of groove 22 lengthwise and parallel to the axis of said plunger. Slot 34a is defined by two plane faces 35a, 36a parallel to the axis of plunger 3 and by slanted end 37a which defines the bottom of the slot and which progressively slants away from the axis of plunger 3, when following said end away from groove 22.

A perpendicular section of this slit is defined by a rectangular outline with one side omitted. Slant 34a opens up on one side into groove 22 and on the other side at the periphery of plunger 3.

Slot 34b is symmetrical to slot 34a relative to a plane perpendicular to the axis of plunger 3 and is positioned at an equal distance of the sides of groove 22. Slots 34c and 34d which are symmetrical to slots 34a and 34b with respect to the axis of plunger 3 are preferably provided to equalize the pressures on both sides of the plunger 3.

The distributor provided in accordance with the invention with the above described slots operates as follows. When plunger 3 is in the neutral position, as is illustrated in FIG. 2, communication between grooves 13 and 14 is not cut off abruptly as was described above. As long as slots 34b and 34d open at least in part into groove 13, the liquid can flow from said groove 13 to groove 14 and return to reservoir 11 by conduit 16. The circulation in the control circuit 12 is maintained and while the flow through opening 18 persists, valve 4 remains slightly opened in a position which is dependent on the outflow of liquid into circuit 12, thus dependent on the position of plunger 3. The cut off of the circulation of the liquid through slots 34b and 34d takes place gradually during the displacement of the plunger and is accompanied by an increasing pressure drop. The pressure in conduit 15 and chamber 17 increases gradually but without reaching the threshold pressure fixed by valve 19.

Likewise, the pressure in chambers 9 and 26 increases and the user can gradually reach the necessary pressure to displace the piston of jack 25. Thus the user can achieve a displacement speed of the piston of jack 25 which is proportional to the extent of closing of control circuit 12 by means of slots 34b and 34d, and thus by controlling the relative distance of valve 4 to its seat 5. The gradual closure of valve 4 decreases the outflow of liquid from chamber 9 to chamber 10 and reservoir 11. In this manner, the volume of liquid flowing towards jack 25 through chamber 26 increases and with it the displacement speed of the piston of jack 25. Conversely, with the gradual opening of valve 4, the displacement speed of the piston is decreased.

As long as control circuit 12 remains open by means of slots 34b and 34d, an abrupt overloading of jack 25 merely causes a displacement of valve 4 towards the left without causing the opening of valve 19. The overloading of the jack results in an increase of pressure in chamber 9, an increase of flow through opening 18 and a greater pressure drop between the front and the back of valve 4. This causes valve 4 to be pushed back a little further towards the left and thereby facilitates the flow of liquid from chamber 9 to chamber 10 and into reservoir 11. The increase of pressure in chamber 9 is thus limited by this opposite reaction to a limit slightly above that of the pressure in chamber 9 prior to overloading.

Such manner of operation is not possible in the absence of the slots since circuit 12 being closed, there would be no flow into opening 18 and valve 4 can only be displaced towards the left when valve 19 opens thereby allowing the flow of liquid into opening 18, that is, when the pressure of the liquid in chambers 9 and 17 is above the threshold pressure. Thus every overloading of the work load at the jack is accompanied by maximum pressure at least equal to the threshold pressure and by very difficult operating conditions of pump P when slots 34a, 34b, 34c and 34d are not provided, as in accordance with this invention.

When plunger 3 is adequately displaced towards the right so that slots 34b and 34d do not open any longer into groove 13, the control circuit 12 is closed. But at that time the communication established by distributor between pump P and jack 25 introduces only a negligible pressure drop insufficient in all cases to cause an opening of valve 19 if the work pressure requirement of jack 25 is not close to the threshold limit. Valve 19 remaining normally closed, valve 4 is also closed and all the outflow of the pump flows to jack 25 under a pressure equal to that required for the operation of said jack. The displacement of the work load is then carried out at the maximum speed compatible with the outflow capacity of the pump.

It is evident that when the pressure in chambers 9 and 17 is higher than the threshold pressure, as for instance when a tool actuated by jack 25 hits an obstacle, valve 19 opens and thereby actuates the opening of valve 4 to maintain chamber 9 close to or at the threshold pressure.

When the user brings plunger 3 back to the neutral position, the opening of control circuit 12 is gradual, valve 4 also opens gradually and the liquid flowing from pump P is conducted to reservoir 11 under a pressure decreasing gradually to nearly zero. Pump P and the entire apparatus are thus protected, the piston impulse, due to the abrupt change of direction of the flow of the liquid, being eliminated.

It is also evident from the above description that for a displacement of plunger 3 towards the left from a neutral position, the operation is identical to slots 34a and 34c operating instead of slots 34b and 34d.

In accordance with the above invention there is provided a distributor which provides a simple, efficient, economical and fast operation, a gradual increase and decrease of the pressure of the pump P and which prevents the operation of the pump at the threshold limit during the small displacements of plunger 3 away from the neutral position.

As is apparent, the invention is not limited to the above described embodiments or their method of operation but encompasses all the variants particularly those in which slots 34 are of different shapes or vary in number depending on the need and includes further embodiments of the invention where several slide valves and distributors would be positioned in parallel and those in which the slots are used on the body of distributor 1 and between grooves 13 and 14 for instance.

Figure 4:
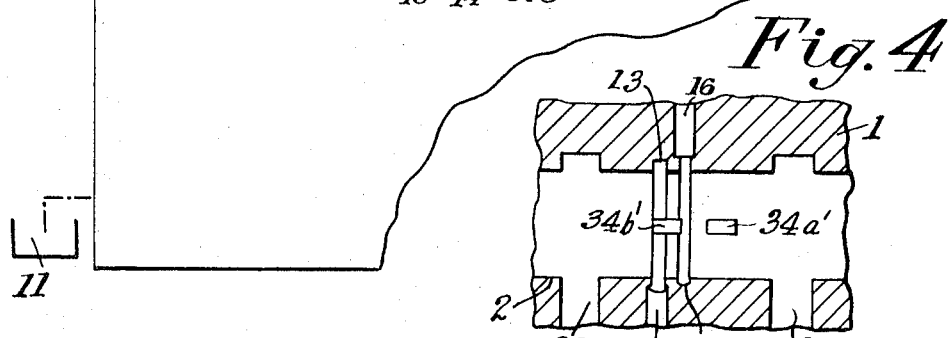
FIG. 4 is a partial longitudinal section of the distributor showing the recesses or slots in the distributor body.
Figure 3:
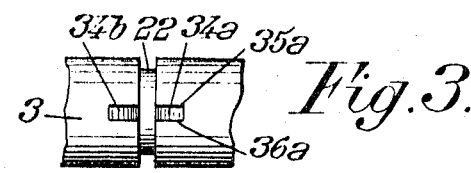
FIG. 3 is a partial plan view of the plunger of the distributor showing the groove and the slots of the plunger.

The last-named variant is illustrated in FIG. 4 of the drawings, which shows, in longitudinal section, a fragment of the interior of cylindrical bore 2 in distributor body 1. In this form of the invention, this body 1 contains not only the annular chambers, or grooves 13 and 14 as well as passages 15, 16 and 26 previously described in connection with FIGS. 1 and 2, but also sloping slots 34a and 34b. These slots are formed in the outer wall of bore 2 in positions corresponding to those occupied by slots 34a and 34b on plunger 3, when that plunger is in its neutral position within body 1 (see FIG. 1). These slots 34a and 34b slope radially outward with respect to cylindrical bore 2, so that they are deepest at their confronting ends and shallowest at their remote ends. When those slots are provided in bore 2, then the slots in plunger 3 may be omitted, or alternatively, slots may be provided in both the plunger 3 and bore 2. This condition can be visualized, in the drawings, by picturing the plunger segment of FIG. 3 inserted in the bore of FIG. 4.

I claim:

1. In an hydraulic distributor for use between a source of fluid under pressure and a load to be subjected to flow therefrom, including as relatively displaceable components a body and a control element fitting slidably together and having passages therein and being reciprocable between a neutral position in which there is no flow to the load and at least one working position in which a working circuit is established through juxtaposable passages therein for flow between the pump and the load, the improvement wherein the relatively displaceable components are provided with additional passages cooperative with one another to comprise a control circuit between the source of fluid under pressure and a fluid reservoir at negligible pressure, a relief valve located between the source and the reservoir and adapted to open in accordance with flow through the control circuit and, when open, to pass fluid from the source to the reservoir, and means biasing the valve under a given force to a closed position, the valve having in both positions a restricted passage therethrough as part of the control circuit, and at least one of the relatively displaceable components having at its junction with the other relatively displaceable component as part of the control circuit a passageway whose effective cross-section depends upon displacement distance from the neutral position and decreases in accordance therewith.

2. Hydraulic distributor according to claim 1, wherein the control circuit comprises two passages spaced a fixed distance apart in the axial direction, and the passageway whose effective cross-section depends upon displacement distance extends further in the displacement direction than that fixed spacing distance and is located to connect those two passages together at the neutral position and at all positions between the neutral position and working position, the maximum extent of that passageway in the displacement direction from neutral approaching the spacing of the working position from neutral, so that, as the passages of the working circuit become juxtaposed sufficiently to permit initial flow therethrough from the source to the load, the effective cross-section of that passageway of the control circuit reaches a minimum value at which flow contains in the control circuit, and when the passages of the working circuit are fully juxtaposed by complete displacement to the working position the control circuit is closed off by reason of loss of communication between that passageway and one of the cooperating passages of the control circuit.

3. Hydraulic distributor according to claim 1, including a control valve interposed between the control circiut and the reservoir, and means biasing it to a normally closed position, so that upon occurrence of excessive pressure in the control circuit this valve is adapted to open and thereby pass fluid from the control circuit to the reservoir, thereby limiting the effective source of pressure by inducing opening of the relief valve to pass fluid from the source to the reservoir.

4. Hydraulic distributor comprising a body having passages therethrough including an inlet for fluid under pressure from a source thereof, a working outlet for such fluid to a load, a return inlet for such fluid from the load, and at least one outlet for fluid to a reservoir at negligible pressure, and a succession of passages comprising part of a control circuit between the first inlet and an outlet to the reservoir; a control cylinder fitting slidably within the body and displaceable relative thereto between (i) a working position in which the working circuit is completed by at least one passage in the cylinder, and the control circuit is obstructed by the cylinder, and (ii) a neutral position in which the working circuit from the first inlet to the working outlet is obstructed by the cylinder, and the control circuit is completed by at least one passage in the cylinder, including a graduated passage adapted to complete the control circuit fully at the neutral position, intermediately at intermediate positions, and minimally at the working position, by reason of corresponding interconnection of a plurality of passages by the graduated passageway in the control circuit at the respective displacement positions; and a relief valve interposed between that first inlet and an outlet to the reservoir and having a restricted passage continuously open therethrough from the first inlet to a passage in the control circuit, and means biasing the relief valve to a closed position except in the instance of flow through the control circuit.

5. Hydraulic distributor according to claim 4, wherein the spacing of the neutral and working positions from one another in the displacement direction slightly exceeds the greatest extent over which the connection of the control circuit passages can be made by the graduated passage, so that when the working circuit is complete for maximum flow therethrough the connection is broken and there is no flow through the control circuit, and so that when the working circuit is initially made the connection still exists but is at a minimum and there is slight flow through the control circuit.

6. A hydraulic distributor which comprises, in combination:
 a distributor body,
 a slide valve positioned within said distributor body, said slide valve comprising a bore in said distributor body and a plunger adapted for relative displacement to one another between a neutral position and an operative position and having surfaces in sliding contact,
 a pilot valve,
 a control circuit connected to the slide valve and controlling the opening and closing of said pilot valve, the distributor being adapted to be opened when the slide valve is in the neutral position and closed when the slide valve is in operative position,
 said control circuit comprising two separate annular chambers positioned within said distributor body and displaced with respect to each other along the axis of said slide valve,
 two conduits adapted to connect one said chamber to a pressure means and the other said chamber to a container for liquid,
 said slide valve being adapted to provide, when in the operative position, for the closure of said chambers, thereby separating them,
 a third annular chamber embodied peripherally in the slide valve communicating with said annular chambers when said slide valve is in the neutral position,
 at least one of said bore and plunger having recesses therein which extend in a direction substantially parallel to the direction of said relative displacement, said recesses having cross-sections perpendicular to the direction of said relative displacement which vary in a continuous manner, one end of said recesses opening into one of said two first mentioned chambers and the other end terminating at the surfaces of said slide valve which come into sliding contact with each other, the recesses being so positioned as to cause a gradual opening of the control circuit during said relative displacement.

7. The distributor of claim 6 in which the plunger has two said recesses in the form of slots positioned peripherally, said slots being symmetrical with reference to a plane perpendicular to the axis of said slide valve and said slots opening into said third chamber and at the outer periphery of the plunger, the cross-sections of the slots perpendicular to said direction of relative displacement decreasing as the distance from the said third chamber increases.

8. The distributor of claim 7 which comprises two additional slots symmetrical to the first pair of slots with respect to the axis of the slide valve, said additional slots being provided to equalize the pressures on the slide valve.

9. The distributor of claim 7 in which said slots are positioned in said distributor bore between said first two annular chambers, at least one slot thereof being connected with each said third chamber and the cross-section of each of said slots decreasing as its distance from said last-mentioned chamber increases.

10. The distributor of claim 6 in which the recesses are slots positioned on the distributor body and on the plunger.

References Cited

UNITED STATES PATENTS

| | | | |
|---|---|---|---|
| 2,448,532 | 6/1948 | Kirkham | 137—596.12 X |
| 2,949,097 | 8/1960 | Vander Kaay | 137—625.68 |
| 2,994,346 | 8/1961 | Ruhl | 137—596.12 |
| 3,160,167 | 12/1964 | Martin | 137—596.12 X |
| 3,160,174 | 12/1964 | Schmiel et al. | 137—596.12 X |
| 3,255,777 | 6/1966 | Rice et al. | 137—596.2 X |
| 3,295,551 | 1/1967 | Malott | 137—596.13 X |

M. CARY NELSON, Primary Examiner

R. J. MILLER, Assistant Examiner